United States Patent [19]

Michel

[11] 4,281,073

[45] Jul. 28, 1981

[54] METHOD OF PRODUCING CROSS-LINKED, UNSATURATED POLYESTERS

[75] Inventor: Joseph P. Michel, Anglet, France

[73] Assignee: Martine Anciaux widow Vastesaeger, Anglet, France; a part interest

[21] Appl. No.: 943,332

[22] Filed: Sep. 18, 1978

[30] Foreign Application Priority Data

Sep. 28, 1977 [FR] France ................ 77 29123

[51] Int. Cl.$^3$ ........................................... C08G 63/76
[52] U.S. Cl. ........................................ 525/11; 521/54;
521/92; 521/123; 521/138; 521/182; 521/907;
525/12; 525/20; 525/49; 525/437
[58] Field of Search ............... 521/182, 138; 528/273;
260/865, 869; 525/12, 20, 11

[56] References Cited

U.S. PATENT DOCUMENTS 3,350,475  10/1967  Watanabe et al. ............... 525/12
3,894,984  7/1975   Demmler et al. ............... 525/12

Primary Examiner—Morton Foelak
Attorney, Agent, or Firm—Sandler & Greenblum

[57] ABSTRACT

A method of producing cross-linked unsaturated polyesters from a solution of a linear unsaturated polyester in a cross-linking agent, wherein a reaction medium comprising said solution and containing free hydroxyl radicals is brought in contact, at room temperature and under atmospheric pressure, with at least one hydrolyzable chlorine-containing derivative in an amount from 0.1 to 10% by weight, based on said solution.

9 Claims, No Drawings

METHOD OF PRODUCING CROSS-LINKED, UNSATURATED POLYESTERS

The present invention relates to a method of producing cross-linked, unsaturated polyesters and the application of this process to the production of filled foamed materials having high mechanical characteristics and an excellent resistance to fire.

It is known that linear unsaturated polyesters may be cross-linked by bringing them in contact with cross-linking agents, for example vinyl monomers such as styrene, methyl methacrylate, vinyl toluene, triallyl cyanurate, diallyl phthalate, or diisocynates (when the polyesters still present free OH groups). Most often, in practice, the linear polyester is marketed in the form of a solution in the cross-linking agent, and polymerisation initiators and accelerators are added to initiate, then maintain, the cross-linking which causes gelation of the starting liquid medium.

However, cross-linking takes place at a high speed, over a period between a few seconds and a few minutes, only if the reaction occurs at a high temperature, this presenting numerous drawbacks in industrial production.

One object of the invention is to allow a very considerable acceleration of the cross-linking under the normal conditions of temperature and pressure.

According to the invention, there is provided a method of producing cross-linked unsaturated polyesters from a solution of a linear unsaturated polyester in a cross-linking agent, in which a reaction medium comprising said solution and containing free hydroxyl radicals is brought in contact, at room temperature and at atmospheric pressure, with at least one hydrolysable chlorine-containing derivative in an amount ranging from 0,1 to 10% by weight based on said solution.

Hydrolysis of the chlorine-containing derivative by the hydroxyl radicals present in the medium is a strongly exothermic reaction and the heat thus produced raises the temperature of the reaction medium and thus provokes a strong acceleration of the cross-linking.

The OH radicals present in the reaction medium may have different origins. They may come from the unsaturated polyester itself, esterified incompletely, from the water present in adsorbed form in inert fillers introduced in the reactional medium, or from the water present in free form, added to the reaction medium.

The acceleration of the gelation of the unsaturated polyesters provided by the invention considerably broadens the possibilities of use of these polyesters, as it makes it possible to obtain foamed products based on these polyesters under excellent conditions.

The foaming step proceeds in fact very quickly and it is necessary to effect it simultaneously with the cross-linking. In the case of the unsaturated polyesters, the duration of the cross-linking opposed nitherto the production of foamed products. This difficulty is overcome by the invention which precisely provides a considerable acceleration of the cross-linking.

There is also provided according to the invention a method of manufacturing foamed materials, wherein the reaction medium contains at least one foaming agent.

This method is particularly advantageous as it starts from products of low viscosity. This makes it possible to introduce in the reaction medium mineral fillers of different types in a very high proportion. Filled foamed products are obtained having a real mineral skeleton, the density of which may reach 500 kg/m$^3$ and which present an excellent compressive strength of up to 100 kg/cm$^2$. Moreover, the cross-linked unsaturated polyesters have, per se, a good thermal stability. The foamed products obtained will therefore have a superior fire resistance and will advantageously be used as building materials. These characteristics make it possible, moreover, to produce homogeneous sandwich-panels by laminating pre-pregs of the same basic material, namely an unsaturated polyester, on blocks or plates of an already foamed and cross-linked material, or by applying on the walls of a mold two sheets of a non-cross-linked, reinforced, unsaturated polyester and by introducing the liquid to be foamed inside the mold.

A particularly advantageous embodiment consists in incorporating a finely carbonate in the reaction medium. The hydrolysis of the chlorine-containing derivatives gives rise to hydrochloric acid which reacts with the carbonate to form carbon dioxide gas. The carbon dioxide gas acts as the foaming agent of the mixture.

On the other hand, the reaction products of the chlorides with the carbonates are inert substances which serve as fillers in the final foamed product.

Starting materials

I. Polymerisable mixture:

The starting linear unsaturated polyesters are obtained by more or less complete esterification of acids, such as adipic acid, maleic acid, phthalic acid, by polyhydric alcohols such as glycols or hexanetriol. Ethyleneglycol polymaleatesphthalates are preferably used, with an OH value of between 30 and 250. The same polyesters may also be used, but in chlorinated or brominated form, this improving fire-proofing.

The chain length of these polyesters may vary. Short chain polyesters will be chosen if rigid final products are desired, and long chain polyesters will be chosen if more supple products are desired.

The cross-linking of these polyesters occurs by opening of their double bonds and formation of cross-linkages under the action of cross-linking agents such as vinyl monomers, particularly styrene, vinyltoluene, methyl methacrylate, diallyl phthalate, triallyl cyanurate, or the diisocyanates, when the polyesters still contain OH groups.

In practice, polyesters are marketed in the form of solution in the cross-linking agent, the mixture further containing polymerisation inhibitors such as quinone derivatives.

The proportion of the cross-linking agent in these mixtures is generally from 20 to 30% by weight. Such mixtures are sold in particular under the Trademark SYNOLITE by Synres, Netherlands, under the Trademark STRATYL by Rhône-Poulenc, France, or under the Trademark HETRON by Hooker Chemical Company, United States of America.

To start polymerisation, which causes a gelation of the starting liquid mixture, polymerisation initiators are added, particularly organic peroxides (benzoyl peroxide, methylethyl ketone) and accelerators such as paratoluidine or cobalt octoate.

II. Chlorine-containing derivatives

A hydrolysable chlorine-containing derivative is suitably selected among phosphorus trichloride $PCl_3$, phosphorus oxychloride $POCl_3$, phosphorus pentachloride $PCl_5$, boron chloride $BCl_3$, silicon chloride $SiCl_4$, or an acide chloride, particularly acetyl chloride or benzoyl chloride.

All these chlorine-containing derivatives are totally hydrolysed with a considerable production of heat.

The amount of these chlorine-containing derivatives is between 0,1 and 10%, based on the polyester.

The mineral chlorine-containing derivatives are highly reactive and it is suitable to dilute them in a chemically inert substance. To this end, trichlorofluoromethane may be used which will serve at the same time as auxiliary foaming agent. This precaution is less necessary with the acid chlorides.

It should be noted that the action of the chlorine-containing derivatives is not limited to the indirect effect of their hydrolysis. In fact, the chlorine-containing derivatives strongly accelerate the decomposition of the reaction initiators, which causes a rapid increase in the molecular weight and thus in the viscosity. In addition, they directly destroy the quinone type reaction inhibitors.

III. Inert fillers

The carbonates which may advantageously be used are, above all, calcium carbonate, magnesium carbonate and ammonium carbonate.

Fly ashes, "floating" ashes, bentonite, diatomite will be mentioned as fillers containing adsorbed $H_2O$.

As fillers with fire-proofing effect, particular mention will be made of hydrated alumina $Al(OH)_3$ and antimony trioxide $Sb_2O_3$.

Finally, reinforcing fillers may be used which are formed of silica, hollow or solid glass spherules, glass fibrils.

The starting mixture being liquid, the inert mineral fillers may be used in very high proportions, up to a total of 80% by weight, based on the final foamed product. The ratio of mineral fillers to organic substances is, however, preferably between 30/70 and 55/45 if all the fillers used are considered.

Action of the chlorine-containing derivatives

To test the influence of the chlorine-containing derivatives on the cross-linking speed of the unsaturated polyesters, the duration of gelation is measured at 20° C. for a polymerisable mixture containing SYNOLITE FTP 1140 (Trademark of a product derived from ethyleneglycol polymaleate-phthalate and methyl methacrylate, sold by Synres), methylethylketone peroxide as polymerisation initiator and cobalt octoate at 5% as accelerator as well as phosphorus trichloride $PCl_3$, then the duration of gelation of the same mixture without $PCl_3$ is measured.

Two tests are effected each time with different proportions of initiator and accelerator. The results are given in the following Table:

| Components | Parts (by Weight) | | | |
|---|---|---|---|---|
| | Test No. 1 (comparison) | Test No. 2 (invention) | Test No. 3 (comparison) | Test No. 4 (invention) |
| SYNOLITE FTP 1140 | 100 | 100 | 100 | 100 |
| methylethylketone peroxide | 1 | 0.6 | 0.8 | 0.8 |
| 5% cobalt octoate | 0.5 | — | 0.03 | 0.03 |
| phosphorus trichloride | — | 0.2 | — | 0.17 |

-continued

| Components | Parts (by Weight) | | | |
|---|---|---|---|---|
| | Test No. 1 (comparison) | Test No. 2 (invention) | Test No. 3 (comparison) | Test No. 4 (invention) |
| duration of gelation | 15 min. | 4 min. | 12 hrs. | 20 min. |

In the first series of tests (Nos. 1 and 2), it is observed that the duration of gelation is reduced from 15 to 4 min. when $PCl_3$ is added, although no accelerator is then used.

In the second series (Nos. 3 and 4), the quantity of accelerator has been reduced to 0.03%. The duration of gelation, consequently, is decreased to 12 hrs. in the absence of $PCl_3$, but is only 20 min. if $PCl_3$ is added.

Production of the foamed polyesters and characteristics

For the preparation of the filled foamed unsaturated polyester products, a first mixture A comprising the polyester+cross-linking agent system, the initiators and accelerators and the fillers, is formed. A second mixture B is formed with the or each chlorine-containing derivative in solution in a halogen hydrocarbon (trichlorofluoromethane, trichloroethylene, carbon tetrachloride), in a vinyl monomer such as styrene or in a linear unsaturated polyester with low hydroxyl value, or in a mixture of at least two of these substances.

The two mixtures are mixed, with intimate homogenisation by a rapid stirring by means of a mechanical stirrer. The reaction starts at 20°-25° C. and the temperature rapidly reaches 80° to 120° C., under atmospheric pressure.

EXAMPLE 1

An ethyleneglycol polymaleate phthalate, with an OH value of 180, diluted in 25% styrene based on the polyester is used as the unsaturated polyester. The liquid system has a viscosity of 300 cPs.

| Mixture A | |
|---|---|
| Polyester/styrene system | 1000 g |
| Benzoyl peroxide | 8 g |
| Methylethylketone peroxide | 2 g |
| Dimethylparatoluidine | 2 g |
| Magnesium carbonate | 40 g |
| Antimony bioxide | 200 g |
| Hydrated alumina | 500 g |
| Bentonite | 250 g |
| Mixture B | |
| Phosphorus trichloride | 10 g |
| Trichlorofluoromethane | 50 g |

Polymerisation effected as indicated hereinabove.

The foaming step is completed in a few minutes. The foamed product obtained has a density of 300 kg/m³ (ratio of mineral fillers/organic substances in the product: about 50/50).

Its compressive strength is 40 kg/cm² and its tridimensional heat stability lies between 150° and 200° C.

(The tridimensional heat stability may be defined as the duration of life in the furnace. To measure it, a sample of 20×20×4 cm is placed edgewise in a drier at 100° C. The temperature is raised at the rate of 10° C. per hour and the possible deformations are observed (shrinking, swelling, etc.) are noted. A stable material does not present any deformation.)

The final products present, in addition, the following characteristics.

| | |
|---|---|
| Thermal insulation coefficient λ 0.032 kcal/m/hr/°C. (according to French standard NF X 10021) | |
| Average acoustic attenuation | |
| low-Pitched | 30 |
| average | 65 |
| high pitched | 75 |
| Bacteria resistance | |
| no development after 2 months | |

The fire resistance of the foamed product obtained is evaluated according to two different methods.

(a) Fire resistance: A sample is subjected to the action of an electrical resistor of 500 watts for at least 20 min. The observations correspond to class M1 according to French standard NFP 92 507. Moreover, no piercing is observed.

(b) Burning test of mines: A sample of a density of 300 kg/m$^3$ exposed to the flame of a propane blow pipe does not present any piercing after 2 hours of exposure. After 1 hour, the temperature measured on the face remote from the face exposed to the flame is only 90° C. This face then presents no browning. With a sample of a density of 500 kg/m$^3$, no piercing is observed after 5 hours of exposure to the flame.

EXAMPLE 2

The same polyester/styrene system as in Example 1 is used.

| Mixture A | |
|---|---|
| Polyester/styrene system | 1000 g |
| Benzoyl peroxide | 7 g |
| Methylethylketone peroxide | 2 g |
| Dimethylparatoluidine | 5 g |
| Calcium carbonate | 60 g |
| Antimony trioxide | 200 g |
| Hydrated alumina | 1000 g |
| Mixture B | |
| Acetyl chloride | 30 g |

Cross-linking and foaming occur under the same conditions as in Example 1.

The cellular product obtained has a density of 400 kg/m$^3$ (ratio of mineral fillers/organic substances in the product: about 55/45) and a compressive strength of 90 kg/cm$^2$.

| Other characteristics | |
|---|---|
| Heat stability | 180° C. |
| Heat insulation coefficient | λ 0.035 kcal/m/hr./°C. |
| Fire resistance | as in Example 1 |

In Examples 3 to 7 hereinafter, only the compositions of the starting mixtures A and B are indicated. The operating mode is the same as in Examples 1 and 2.

EXAMPLE 3

| Mixture A | |
|---|---|
| STRATYL 515 R-P (polyester/styrene system sold by Rhône-Poulenc | 100 g |
| Benzoyl peroxide | 3 g |
| Methylethylketone peroxide | 0.4 g |
| Paratoluidine | 0.3 g |
| Cobalt octoate at 5% | 0.4 g |
| Magnesium carbonate | 20 g |
| Water | 1 g |
| Diatomite silica | 50 g |
| Mixture B | |
| Monomer styrene | 20 g |
| Phosphorus trichloride | 2 g |

EXAMPLE 4

| Mixture A | |
|---|---|
| SYNOLITE 1574 VG (Trademark of a polymaleate sold by Synres, Netherlands, with an OH value of 237) | 100 g |
| Diisocyanate | 10 g |
| Benzoyl peroxide | 3 g |
| Tert-butyl per-2-ethylhexoate | 1.5 g |
| Paratoluidine | 0.4 g |
| Magnesium carbonate | 10 g |
| Fly ashes | 50 g |
| Antimony trioxide | 10 g |
| hydrated alumina | 100 g |
| Mixture B | |
| Polyester with a OH value lower than 30 | 80 g |
| Styrene | 20 g |
| Phosphorus trichloride | 2 g |
| Silicon tetrachloride | 2 g |

EXAMPLE 5

| Mixture A | |
|---|---|
| Uceflex 1 32 A (produced by Union Chimique Belge) | 100 g |
| Benzoyl peroxide | 3 g |
| tert-butyl per-2-hexoate | 1.5 g |
| Paratoluidine | 0.6 g |
| Calcium carbonate | 20 g |
| Bentonite | 100 g |
| Glass spherules | 100 g |
| Mixture B | |
| Trichlorofluoromethane | 20 g |
| Phosphorus trichloride | 2 g |
| Silicon tetrachloride | 2 g |

EXAMPLE 6

| Mixture A | |
|---|---|
| HETRON (polyester produced by Hooker Chemical Company, formed by reacting a glycol with a chlorinated unsaturated diacid itself deriving from hexachlorocyclopentadiene and phtalic anhydride) | 100 g |
| Styrene | 10 g |
| Benzoyl peroxide | 3 g |
| Tert-butyl per-2-hexoate | 3 g |
| Dimethylparatoluidine | 0.3 g |
| Glycol | 10 g |
| Hollow glass spherules | 20 g |
| Mixture B | |
| Trichlorofluoromethane | 20 g |
| Phosphorus oxychloride | 10 g |

EXAMPLE 7

| Mixture A |
|---|

| -continued | |
|---|---|
| SYNOLITE 892 (sold by Synres, Netherlands) | 100 g |
| Benzoyl peroxide | 3 g |
| Methylethylketone peroxide | 0.3 g |
| Paratoluidine | 0.3 g |
| Calcium carbonate | 30 g |
| Alumina | 120 g |
| Mixture B | |
| Styrene | 10 g |
| Trichlorofluoromethane | 20 g |
| Phosphorus petachloride | 3 g |

I claim:

1. A method of producing cured unsaturated polyesters from a solution of linear unsaturated polyester in a cross-linking agent, comprising the step of contacting, at room temperature and under atmospheric pressure, a reaction medium comprising said solution and a free radical initiator and containing free hydroxyl radicals with at least one totally hydrolyzable chlorine-containing derivative in an amount from 1 to 10% by weight, based on said solution, said chlorine-containing derivative being selected from the group comprising phosphorous chloride, phosphorous oxychloride, and silicon chloride and an acid chloride selected from acetyl chloride and benzoyl chloride, to thereby form said cured unsaturated polyesters in a single step without the external application of heat.

2. A method according to claim 1, wherein the linear unsaturated polyester has a hydroxyl value of between 30 and 250.

3. A method according to claim 1, wherein the reaction medium comprises mineral fillers containing water in adsorbed form.

4. A method according to claim 1, wherein the reaction medium contains water in free form.

5. A method according to claim 1, wherein the linear unsaturated polyester is a polyethyleneglycolmaleatephthalate.

6. A method according to claim 1, wherein the unsaturated polyester is formed by reacting a glycol with a chlorinated unsaturated dibasic acid.

7. A method according to claim 1 wherein said at least one hydrolyzable chlorine-containing derivative is present in an amount of from greater than 1% to 10% by weight based on said solution.

8. A method according to claim 7 wherein said at least one hydrolyzable chlorine-containing derivative is present in an amount of from 1.7 to 10% by weight based on said solution.

9. A method according to claim 1 wherein the mixture of claim 1 is of a low viscosity prior to curing.

* * * * *

UNITED STATES PATENT AND TRADEMARK OFFICE
CERTIFICATE OF CORRECTION

PATENT NO. : 4,281,073
DATED : July 28, 1981
INVENTOR(S) : Joseph P. MICHEL

It is certified that error appears in the above—identified patent and that said Letters Patent is hereby corrected as shown below:

Column 1, line 17, change "polymerisation" to ---polymerization---;
Column 1, line 35, change "hydrolysable" to ---hydrolyzable----;
Column 1, line 37, change "0,1" to ---0.1---;
Column 1, line 58, change "nitherto" to ---hitherto---;
Column 2, line 20, change "acide" to ---acid---;
Column 2, line 50, change "polymerisation" to ---polymerization---;
Column 2, line 59, change "polymerisation" to ---polymerization---;
Column 2, line 60, change "polymerisation" to ---polymerization---;
Column 2, line 65, change "hydrolysable" to ---hydrolyzable---;
Column 3, line 1, change "acide" to ---acid---;
Column 4, line 31, change "homogenisation" to ---homogenization---;

UNITED STATES PATENT AND TRADEMARK OFFICE
CERTIFICATE OF CORRECTION

PATENT NO. : 4,281,073

DATED : July 28, 1981

INVENTOR(S) : Joseph P. Michel

It is certified that error appears in the above—identified patent and that said Letters Patent is hereby corrected as shown below:

Column 4, line 55, "Polymerisation" should read
-- Polymerization --.

Signed and Sealed this

Thirteenth Day of April 1982

[SEAL]

Attest:

GERALD J. MOSSINGHOFF

Attesting Officer

Commissioner of Patents and Trademarks